(12) United States Patent
Hartmann (10) Patent No.: US 10,973,283 B2
(45) Date of Patent: Apr. 13, 2021

(54) METHOD FOR PRODUCING A SHOE

(71) Applicant: PUMA SE, Herzogenaurach (DE)

(72) Inventor: Matthias Hartmann, Forchheim (DE)

(73) Assignee: Puma SE, Herzogenaurach (DE)

( * ) Notice: Subject to any disclaimer, the term of this patent is extended or adjusted under 35 U.S.C. 154(b) by 0 days.

(21) Appl. No.: 16/620,153

(22) PCT Filed: Jun. 6, 2017

(86) PCT No.: PCT/EP2017/000651
§ 371 (c)(1),
(2) Date: Oct. 22, 2020

(87) PCT Pub. No.: WO2018/224113
PCT Pub. Date: Dec. 13, 2018

(65) Prior Publication Data
US 2021/0052040 A1   Feb. 25, 2021

(51) Int. Cl.
*B29C 45/16*   (2006.01)
*A43D 1/02*   (2006.01)
(Continued)

(52) U.S. Cl.
CPC .............. *A43D 1/022* (2013.01); *A43B 13/04* (2013.01); *B29C 45/1603* (2013.01);
(Continued)

(58) Field of Classification Search
None
See application file for complete search history.

(56) References Cited

U.S. PATENT DOCUMENTS 2,499,565 A * 3/1950 Booth .................... B29D 35/02
249/109
3,806,974 A * 4/1974 Di Paolo .............. A43B 13/223
12/142 RS
(Continued)

FOREIGN PATENT DOCUMENTS

DE   2721443   * 11/1978
EP   2206442 A1   7/2010
(Continued)

OTHER PUBLICATIONS

International Search Report for PCT/EP2017/000651, dated Feb. 22, 2018.

*Primary Examiner* — Edmund H Lee
(74) *Attorney, Agent, or Firm* — Quarles & Brady LLP (57) ABSTRACT

The invention relates to a method for producing a shoe (1), comprising a shoe sole (2) and an upper (3). In order to provide an optimally fitting shoe in a simple manner, the method comprises the following steps according to the invention: a) providing a casting mould (4) for forming at least part of the shoe sole (2), the casting mould (4) having a bottom region (5), which lies vertically at the bottom, and having a side region (6), the side region (6) forming a side wall of the casting mould cavity (7) and initially being open in the end region lying vertically at the top; b) injecting a first liquid plastic material into a first surface section (8) of the bottom region (5) of the casting mould (4) and at least injecting a second liquid plastic material into a second surface section (9) of the bottom region (5) of the casting mould (4), the two plastic materials being different, the injection of the liquid plastic material being accomplished by means of at least one nozzle (10), by means of which the plastic material is sprayed in a free jet into the surface section (8, 9) in question; c) closing the casting mould (4) by means of a cover region (11) lying vertically at the top, (Continued)

which cover region (1) is placed onto the side region (6) of the casting mould (4), and allowing the plastic materials to harden; d) opening of the casting mould (4) and removing the produced moulded part.

20 Claims, 4 Drawing Sheets

(51) Int. Cl.
    *A43B 13/04*     (2006.01)
    *B29C 45/17*     (2006.01)
    *B29C 45/20*     (2006.01)
    *B29L 31/50*     (2006.01)
    *B29K 75/00*     (2006.01)
    *B29K 105/04*     (2006.01)

(52) U.S. Cl.
    CPC ...... *B29C 45/1676* (2013.01); *B29C 45/1735* (2013.01); *B29C 45/20* (2013.01); *B29K 2075/00* (2013.01); *B29K 2105/04* (2013.01); *B29K 2995/007* (2013.01); *B29K 2995/0021* (2013.01); *B29L 2031/504* (2013.01)

(56) References Cited

U.S. PATENT DOCUMENTS 3,824,716 A    *    7/1974    Di Paolo ................ A43B 13/28
                                                                                                                       36/32 R
2011/0283560 A1    11/2011    Portzline et al.

FOREIGN PATENT DOCUMENTS

| EP | 2649896 A2 | | 10/2013 |
|---|---|---|---|
| FR | 2180904 | * | 11/1973 |
| JP | 63111803 | * | 5/1988 |
| JP | 01005502 | * | 1/1989 |
| WO | 2009/095935 A1 | | 8/2009 |
| WO | 2009/126111 A1 | | 10/2009 |
| WO | 2014/100462 A1 | | 6/2014 |

* cited by examiner

METHOD FOR PRODUCING A SHOE

This application is a U.S. National Stage application, filed pursuant to 35 U.S.C. § 371, of international application no. PCT/EP2017/000651, filed on Jun. 6, 2017, the contents of which is incorporated herein by reference in its entirety.

The invention relates to a method for producing a shoe, especially a sports shoe, comprising a shoe sole and an upper.

Classic manufacturing processes for shoes, in particular for sports shoes, are well known. In most cases, a shoe sole—possibly consisting of several parts (outer sole, midsole, inner sole)—is produced, often by injection moulding a suitable plastic material. The upper of the shoe is then manufactured using leather or textile materials. To complete the shoe, the sole and the upper are joined together, for example by sewing or gluing.

In order to reduce the costs of shoe production, the aim is to keep the time required to produce the sole as short as possible.

Furthermore, it is sometimes desired to consider the individual wishes of the user of a shoe, whereby custom-made products can be made. However, this usually requires a great deal of work, as a considerable amount of work is required from appropriate shoe specialists.

It is the object of the invention to further develop a method of the type mentioned above in such a way that it is possible to provide an optimally fitting shoe in a simple and thus cost-effective manner. The shoe should be produced quickly and thus cost-effectively, but should be able to satisfy the individual needs of the user. The use of specialists in shoe manufacturing should be reduced or completely avoided.

The solution of this object by the invention is characterized in that the production of the shoe sole comprises the steps:
- a) Providing a casting mould for forming at least a part of the shoe sole, wherein the casting mould having a bottom region, which lies vertically at the bottom, and having a side region, wherein the side region forming a side wall of the casting mould cavity and initially being open in the end region lying vertically at the top;
- b) Injecting a first liquid plastic material into a first surface section of the bottom region of the casting mould and at least injecting a second liquid plastic material into a second surface section of the bottom region of the casting mould, wherein the two plastic materials being different, wherein the injection of the liquid plastic material being accomplished by means of at least one nozzle, by means of which the plastic material is injected in a free jet into the respective surface section, or wherein the injection of the liquid plastic material being accomplished by means of at least one spraying head, by means of which the plastic material is sprayed in the respective surface section;
- c) Closing the casting mould by means of a cover region lying vertically at the top, which cover region is placed onto the side region of the casting mould, and allowing the plastic materials to solidify;
- d) Opening of the casting mould and removing the produced moulded part.

In this respect, one aspect of the invention consists in leaving the mould open at the top in order to shape the sole of the shoe and then injecting different plastic material into at least two (surface) areas via the aforementioned nozzle, which takes place in such a way that the plastic material is introduced into the target area of the mould in a free jet, i.e. in the manner of a ballistic curve. This has the advantage that the mould can be filled very quickly, but by using at least two different plastic materials the sole of the shoe can be provided with special and desired mechanical properties.

The alternative procedure mentioned above, according to which the injection of the liquid plastic material is carried out by at least one spray head, by means of which the plastic material is sprayed into the respective surface section, similarly allows the plastic material to be introduced quickly and area-related into the respective area of the mould. A handling device (robot) is preferably used to move the spray head.

The at least one nozzle can thereby be arranged at a location of the side region of the casting mould and all plastic materials are injected from there. The at least one nozzle is preferably joint at a side opening of the casting mould to inject the plastic materials.

Prior to the execution of above mentioned step b) at least one wall can be arranged between the single surface sections of the bottom region, which wall prevents or impedes the flow of plastic material from one surface section to the other surface section. In this case it can be provided that the at least one wall is arranged movable in vertical direction relatively to the bottom region of the casting mould.

Another preferred embodiment of the proposed method provides that after the execution of above mentioned step a) and prior to the execution of above mentioned step b) a pre-manufactured outer sole is layed in the bottom region of the casting mould, which outer sole is part of the shoe sole. The outer sole can thereby have at least one wall at its upward directed side, which wall prevents or impedes the flow of plastic material from one surface section to the other surface section. This wall thus forms various chambers intended for receiving the corresponding plastic material during the production of the midsole. This makes it possible to modify the characteristics of the midsole by using different outer soles. Rubber is the most suitable material for the outsole.

In order to be able to produce a custom-made shoe in a cost-effective manner, a further embodiment provides that before the above-mentioned step a) is carried out, the following steps are carried out:
- a1) Measuring of at least one individual property of the foot of a person and/or of a running characteristic of the person by means of a measuring device;
- a2) Determination of the distribution of a material property and/or of a mechanical property of the shoe sole or of a part of the shoe sole along at least one direction of extension of the shoe sole in dependence on the measured values according step a1) by means of a predetermined algorithm or a predetermined rule;
- wherein subsequently to this the production of the shoe sole according to above mentioned steps a) to d) takes place, so that the material properties and/or the mechanical properties of the shoe sole correspond at least approximately to the distribution as determined according to step a2).

After above mentioned step d) the shoe sole can be connected with the upper to produce the finished shoe; the connection takes place thereby preferably by sewing and/or by gluing of upper and sole.

The measuring according to above mentioned step a1) takes place preferably by determination of the pressure distribution of the foot of the person along the contact area of the foot at the ground, wherein the measurement takes place preferably by means of a pressure sensor plate.

The measuring according to above mentioned step a1) can also take place by determination of the running characteristics of the person, especially the tendency of the foot for pronation or supination, wherein the measuring takes place preferably by means of a camera and a treadmill.

The determination according to above mentioned step a2) takes place preferably by determining the distribution of the material property and/or mechanical property along the longitudinal axis of the shoe sole.

At least one of the used plastic materials, preferably all plastic materials, consists preferably of polyurethane, wherein the material is preferably foamed.

The different plastic materials can thereby differ in their hardness in the solidified state, especially in their Shore hardness. They can also differ in their colour. By using different colours, the user can also be given a visual impression of the individuality of his shoe. Coloured marbling effects are also possible.

The different plastic materials can also differ in the fact that at least one additive is added to a base material in different quantity. By adding an additive, the material property or mechanical property of the polyurethane can thereby be changed and thus specifically controlled. In the state of the art, it is well known which additives are suitable, for example to especially influence the hardness of polyurethane.

All mentioned production steps of the shoe sole take place according to a preferred embodiment in physical proximity, especially in a shoe shop. The proposed process is particularly advantageous if it is carried out on an integrated system which allows the shoe to be manufactured in a concentrated manner both in terms of time and space. The steps can also be carried out in close chronological proximity to each other, in particular within a maximum period of 3 hours. This makes it possible to very quickly offer a customer a shoe which is individually tailored to his needs and which is optimally adapted to his circumstances.

At the location of the production plant for the shoe, in particular thus in a shoe shop, a scan of the customer's foot, for example, is first made and the customer's running characteristics determined. Depending on this, the design of the sole is then determined with regard to different zones and these are then produced on site and connected to a shoe upper.

The mentioned determination of the course of a material property and/or mechanical property of the shoe sole or of a part of the shoe sole is preferably made by determining the distribution of a material property and/or mechanical property along the longitudinal axis of the sole. However, it may also be advantageous to provide that the distribution of a material property and/or mechanical property is determined along the direction of the sole transverse to the longitudinal axis. A combination of both methods is particularly preferred, whereby the mentioned distribution of a material property and/or mechanical property is determined along the plane with which the wearer's foot rests on the ground.

The proposed concept is therefore aimed at producing a sole or a part of a sole directly in a shoe shop in an advantageous way and in line with demand, whereby the sole or a part of the sole has different characteristics in sections or in predefined defined zones.

In an advantageous way, an individually fitting shoe, which is therefore individually adapted to a customer, can be produced quickly and thus cost-effectively. In addition, it is possible to manufacture a shoe sole and thus also the shoe according to the proposed procedure in a very short time, which has economic advantages.

The proposed method is also particularly suitable for the manufacture of a sole for a football shoe.

Thus it can generally be achieved that variations in the structure of the (mid)sole can be realised in a simple way, as far as its physical properties in the different surface areas are concerned.

In the drawings an embodiment of the invention is shown.

Figure 1:
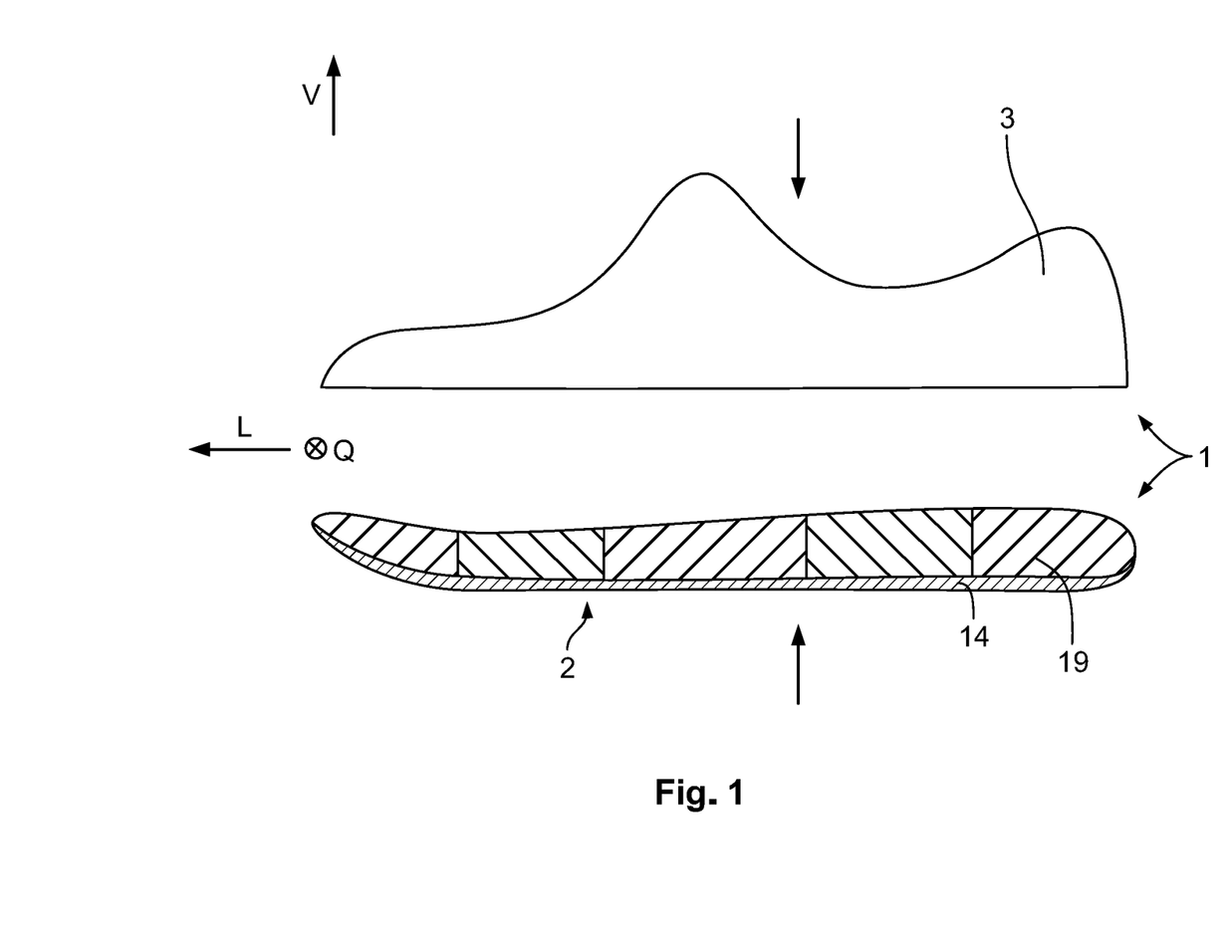
FIG. 1 shows schematically in the side view a shoe upper and a shoe sole of a sports shoe, before those two components are connected with another.

FIG. 1 shows a shoe 1 being a sports shoe, with shoe sole 2 and upper 3 still separated from each other. Shoe sole 2 here consists of an outer sole 14 connected to a midsole 19. After shoe sole 2 has been manufactured, it is connected to upper 3. The shoe sole 2 and the upper 3 are then joined together in the direction of the two arrows.

The figure shows the longitudinal axis L of the sole or of the shoe and a direction Q transverse to it, and furthermore the direction of the vertical V, which refers to the intended use of the shoe.

The production of the midsole 19 is described in the following, a central aspect is that the midsole 19 is made area by area of different plastic materials, which is indicated in FIG. 1 by different hatching.

Figure 2:
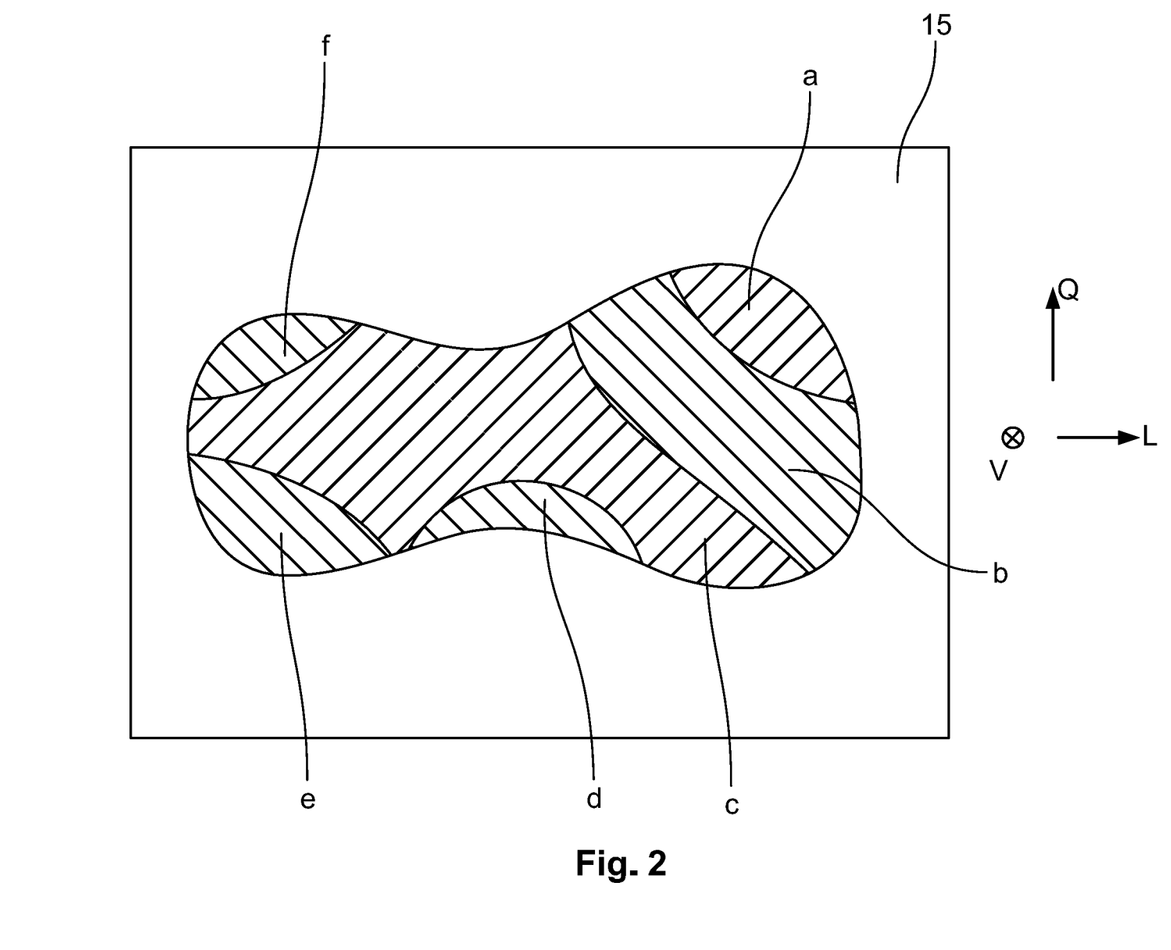
FIG. 2 shows schematically the top plan view of a pressure sensor plate by which the pressure distribution of a foot of a person was recorded along the area of contact with the ground.

FIG. 2 schematically shows a flat pressure sensor plate 15 which acts as a measuring device to measure the pressure distribution when a person steps on the pressure sensor plate 15. Six areas a, b, c, d, e and f are depicted schematically and for illustrative purposes only, where the pressure varies when the person is standing on the floor.

In this respect, the pressure sensor plate 15 can be used to determine how the pressure distribution for an individual person results from the personal ergonomics of the foot. Using the pressure sensor plate 15, it is therefore possible to identify the areas a, b, c, d, e and f in which different pressures prevail (whereby pressure intervals can be defined for each of the areas mentioned). Due to the longitudinal axis L of the foot and correspondingly the shoe sole to be manufactured as well as the transverse direction Q, the pressure distribution over the contact surface of the foot on the ground can therefore be determined for an individual person on the basis of the pressure sensor plate.

Said measurement of the pressure distribution over the tread surface can be a first step in the production of an individual shoe (see step a1 above).

Alternatively or additively, however, said measurement can also be carried out differently: For example, a camera can be used to observe the person's foot while running or jogging on a treadmill, and from this information about the pronation or supination behaviour of the person's foot can be obtained.

In both cases it is generally possible in the further course to determine the distribution of a material property or a mechanical property of the shoe sole to be manufactured in accordance with step a2) above. This means that for different areas of the sole both in the direction of the longitudinal axis L of the sole and in the direction Q transverse to it, for example, the strength or hardness of the sole material is defined, which is aimed at in order to give the foot of the person optimum support.

So, for example, in areas where there is high pressure relative to other areas (see, for example, area a) relative to area d) in FIG. 2), a harder material may be provided than in other areas of the sole to provide better support for the foot.

In the same way, for example, by evaluating the pronation or supination behaviour of the person's foot, additively or alternatively, a deviation from an ideal shape can be counteracted by increasing or decreasing the material strength or stiffness of the sole.

This determination of the course of the material property or mechanical property of the sole via the coordinates L and Q can thereby be carried out by a specialist. It is also possible, however, that the values determined by the measuring device 15 are automatically converted into a corresponding specification for said properties by specifying a corresponding algorithm. The above step a2) is therefore preferably performed automatically by a computer. As the case may be, stored comparison values or optimum values can be used to determine the distribution of the properties, whereby said values can also be taken from a database according to the person's data (e.g. height, weight, gender).

Figure 3:
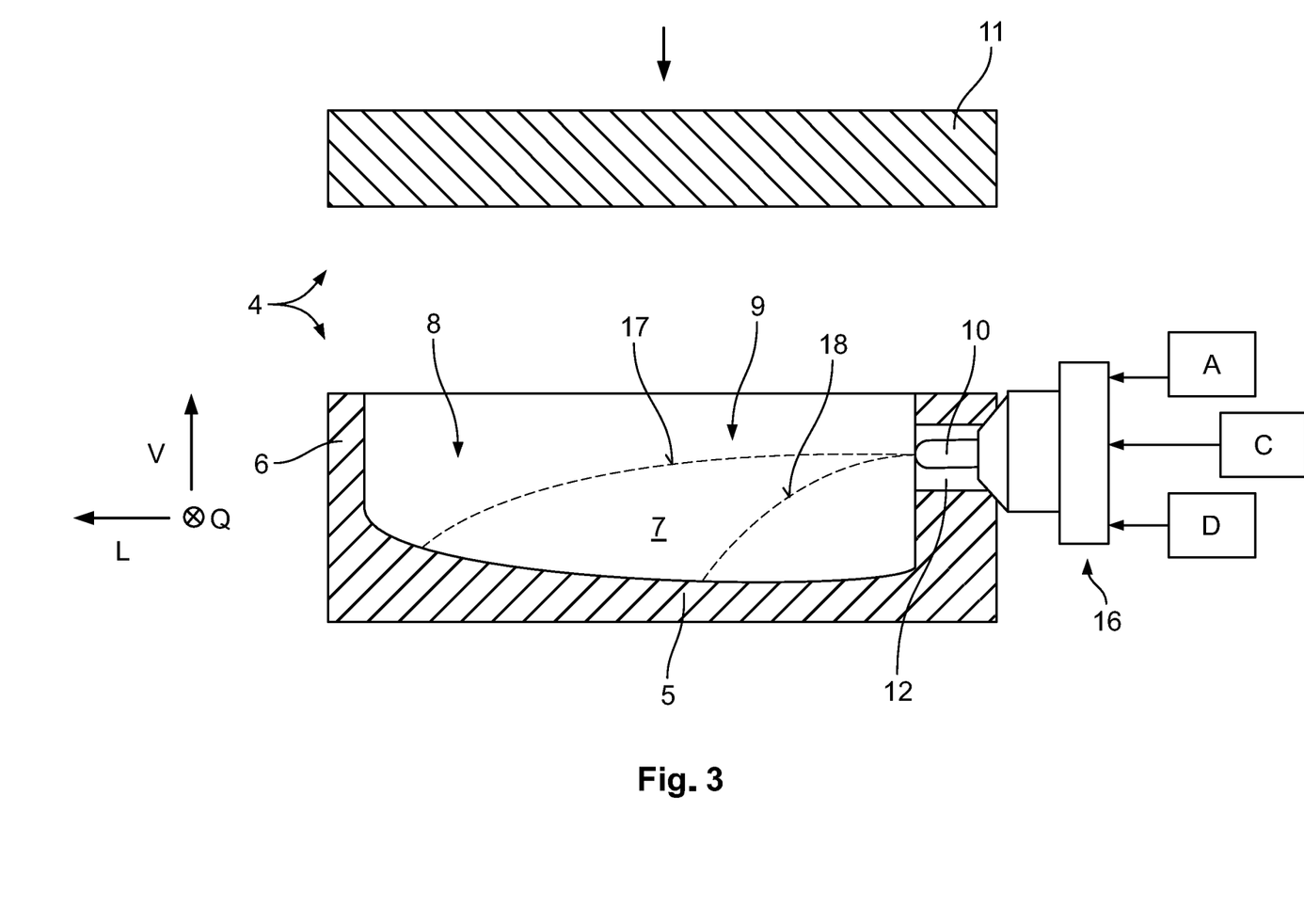
FIG. 3 shows schematically the sectional side view of a casting mould by which the sole of a shoe is produced and FIG. 4 shows the top plan view of the casting mould by which the sole of the shoe is produced.

FIG. 3 illustrates the above steps a) to c) of manufacturing the shoe sole 2.

A casting mould 4 can be seen with which the shoe sole 2 is produced. The casting mould 4 consists of a lower tool part, which has a bottom region 5 and a side region 6 and forms a mould cavity 7 for the shoe sole 2. The casting mould 4 also includes an upper tool part in the form of the cover region 11, which is placed on the lower tool part after the mould has been filled to completely form the shoe sole 2.

The lower tool part of the casting mould has a side opening 12 in one end area of the side region 6, which is designed for attaching or inserting a nozzle 10. The nozzle 10 is connected to a mixing head 16 in which polyurethane is mixed in the embodiment and applied via the nozzle 10. A first base material A in the form of polyol is mixed with a second base material B in the form of isocyanate to form polyurethane. The figure also shows a container for an additive C, which can be added to materials A and B and which changes its material properties or mechanical properties.

After casting mould 4 is provided for moulding the shoe sole 2 in the arrangement depicted in FIG. 3 (i.e. with the cover region 11 raised upwards), liquid plastic material is fed into casting mould cavity 7. This is done by injecting the liquid plastic material via nozzle 10. It is essential that at least two different plastic materials (either via the same nozzle 10 or via several nozzles 10) are fed into the mould cavity. In the embodiment it is indicated that a first liquid plastic material is injected into a first surface section 8 of the bottom region 5 of the casting mould 4 and furthermore a second liquid plastic material is injected into a second surface section 9 of the bottom region 5 (one after the other or parallel in time). The two plastic materials have different properties which can refer to any material parameter.

It is also essential that the liquid plastic material is injected through the nozzle 10 in such a way that the plastic material is injected in a free jet into the respective surface section 8 or 9. FIG. 3 shows a first ballistic trajectory 17 and a second ballistic trajectory 18 which mark the track of the respective plastic material or the jet of the plastic material which takes it until it reaches the bottom region 5 of casting mould 4.

In order to realize corresponding trajectories 17 and 18 respectively, plastic material can be discharged from nozzle 10 by corresponding different pressures (and thus by different speeds). As an alternative or additive it is of course also possible to change the orientation of the nozzle 10 (i.e. the exit angle with respect to the horizontal and also with respect to the longitudinal axis of the sole) so that the liquid plastic material follows the desired path during injection and finally covers the desired surface section of the bottom region of the casting mould.

When the desired amount of material has been introduced into the casting mould cavity, the cover region 11 of casting mould 4 is lowered (see arrow in FIG. 3) so that the plastic material solidifies into the finished shoe sole in a defined shape. The finished shoe sole 2 can then be removed from casting mould 4.

In this way it is possible to place plastic materials with desired material properties in specifically defined surface areas of the shoe sole and in particular of the midsole 19, in order to then obtain a (mid)sole with corresponding properties and adapted to individual needs.

The filling of the casting mould cavity 7 with plastic material, which is injected in a free jet, results in a very short filling time and thus a correspondingly short total production time of the sole, which is advantageous.

Figure 4:
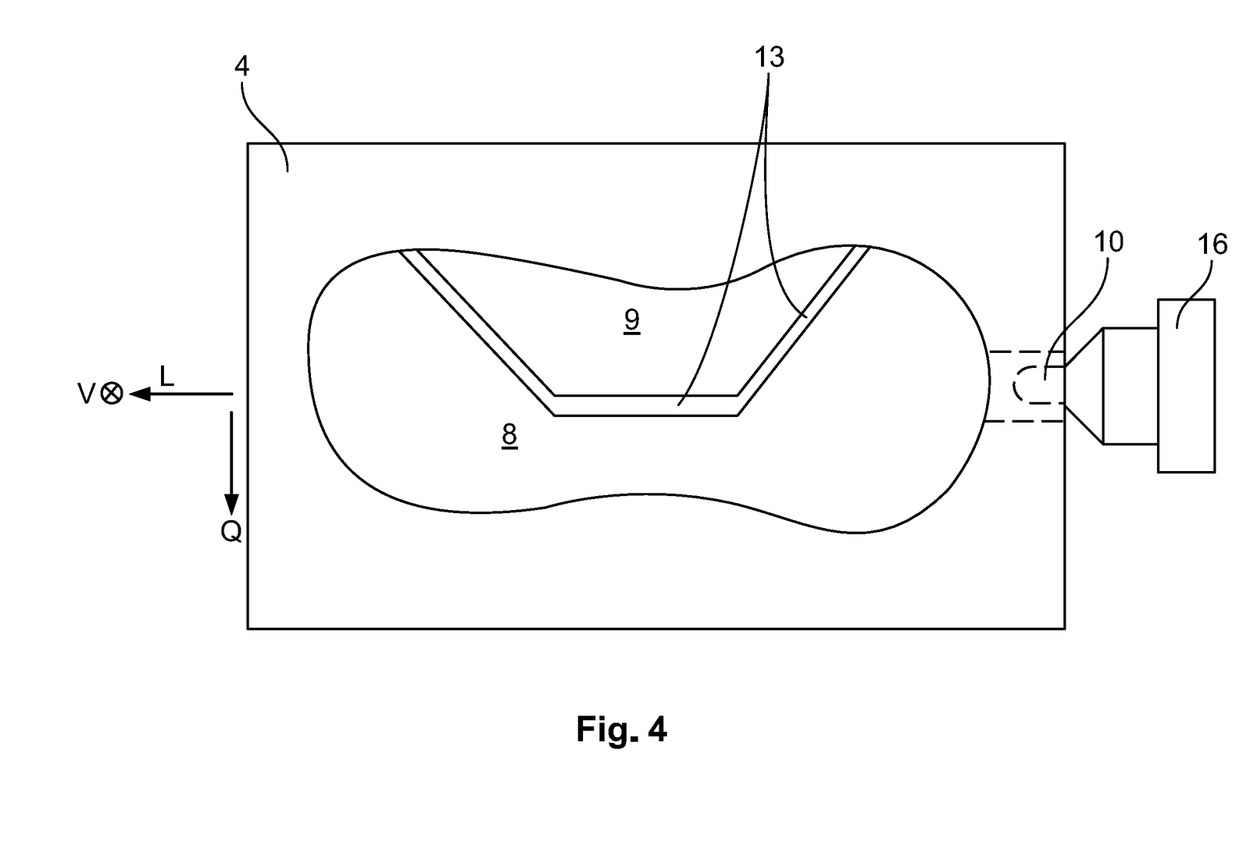

FIG. 4 illustrates a special design of the casting mould 4, which makes it possible to ensure that the various plastic materials are only placed where they are desired. For this purpose, a wall 13 is arranged in the bottom region of the casting mould which, like a weir, ensures that the still liquid plastic material remains in the desired surface section. The wall 13 here is designed as a thin sheet metal, which extends over a certain height from the bottom region 5 of the casting mould 4 into the casting mould cavity 7 during filling of the casting mould and thus produces the desired effect.

Thereby, the wall 13 can be relatively displaceable to the bottom region 5 of the casting mould 4 in vertical direction V, so that it is pulled out of the mould cavity after reaching a sufficient degree of solidification.

The process was illustrated here using two different plastic materials; in fact, of course, more than two different plastic materials can be used. It is also possible that several different surface sections of the bottom region can be filled with the same plastic material.

An alternative possibility, which makes the use of the described wall 13 superfluous, is to insert an outer sole 14 into the bottom region 5 of the casting mould 4 before the liquid plastic material is fed in, wherein the outer sole 14 is material bonded to the midsole 19 during the described production of the midsole 19. The outer sole 14 can have upwardly projecting webs, similar to the wall 13, which ensure that the liquid plastic material remains in its desired surface section until the sole is finished. In order to provide a universally usable outer sole (of a particular shoe size), said web-like walls may be formed in the manner of a pattern forming a plurality of chambers for the liquid plastic material which are then filled with the respective plastic material according to said specification.

The result is a shoe sole 2, as illustrated in FIG. 1. Here it is indicated by the different hatching of the midsole 19 that different sections of the sole 2 are formed by different components A, B and C and in particular by different quantities of additive C added along the direction of extension L of the sole 2, which are characterised by different material properties and/or mechanical properties.

It need not be mentioned at this point that FIG. 1 is a schematic representation of the principle explained in this respect, whereby it may make sense, if the material distribution in two coordinate directions L and Q is specified accordingly, to prepare and inject material through several nozzles 10 or mixing heads 16 and, if necessary, also at different points of the tool, in order to achieve a desired distribution of the material with the respective properties in the plane.

REFERENCE NUMERALS

1 Shoe
2 Shoe sole
3 Upper
4 Casting mould
5 Bottom region of the casting mould
6 Side region of the casting mould
7 Casting mould cavity
8 First surface section
9 Second surface section
10 Nozzle
11 Cover region of the casting mould
12 Side opening of the casting mould
13 Wall
14 Outer sole
15 Measuring device (pressure sensor plate)
16 Mixing head
17 First ballistic trajectory
18 Second ballistic trajectory
19 Midsole
L Direction of extension of the sole (longitudinal axis of the sole)
Q Direction transverse to the longitudinal axis
V Vertical direction
A First base material (polyol)
B Second base material (isocyanate)
C Additive
a, b, c,
d, e, f Regions of different pressure

The invention claimed is:

1. A method for producing a shoe comprising a shoe sole and an upper, wherein the production of the shoe sole comprises the steps:
   a) Providing a casting mould for forming at least a part of the shoe sole, wherein the casting mould having a bottom region, which lies vertically at the bottom, and having a side region, wherein the side region forming a side wall of the casting mould cavity and initially being open in the end region lying vertically at the top;
   b) Injecting a first liquid plastic material into a first surface section of the bottom region of the casting mould and at least injecting a second liquid plastic material into a second surface section of the bottom region of the casting mould, wherein the two plastic materials being different, wherein the injection of the first and second liquid plastic material being accomplished by means of at least one nozzle, by means of which the plastic material is injected in a free jet into the respective surface section;
   c) Closing the casting mould by means of a cover region lying vertically at the top, which cover region is placed onto the side region of the casting mould, and allowing the plastic materials to solidify; and
   d) Opening of the casting mould and removing the produced moulded part, characterized in that
   the at least one nozzle is arranged at a location of the side region of the casting mould and all plastic materials are injected from there.

2. The method of claim 1, characterized in that the at least one nozzle is joint at a side opening of the casting mould to inject the plastic materials.

3. The method of claim 1, characterized in that prior to the execution of step b) at least one wall is arranged between the single surface sections of the bottom region, which wall prevents or impedes the flow of plastic material from one surface section to the other surface section.

4. The method of claim 3, characterized in that the at least one wall is arranged movable in vertical direction relatively to the bottom region of the casting mould.

5. The method of claim 1, characterized in that after the execution of step a) and prior to the execution of step b) of a pre-manufactured outer sole is layed in the bottom region of the casting mould, which outer sole is part of the shoe sole.

6. The method of claim 5, characterized in that the outer sole has at least one wall at its upward directed side, which wall prevents or impedes the flow of plastic material from one surface section to the other surface section.

7. The method of claim 1, characterized in that prior to the execution of step a) of the steps are carried out:
   a1) Measuring of at least one individual property of the foot of a person and/or of a running characteristic of the person by means of a measuring device;
   a2) Determination of the distribution of a material property and/or of a mechanical property of the shoe sole or of a part of the shoe sole along at least one direction of extension of the shoe sole in dependence on the measured values according step a1) by means of a predetermined algorithm or a predetermined rule;
   wherein subsequently to this the production of the shoe sole according to steps a) to d) takes place, so that the material properties and/or the mechanical properties of the shoe sole correspond at least approximately to the distribution as determined according to step a2).

8. The method of claim 1, characterized in that after step d) the shoe sole is connected with the upper to produce the finished shoe, wherein the connection takes place by sewing and/or by gluing.

9. The method of claim 7, characterized in that the measuring according to step a1) takes place by determination of the pressure distribution of the foot of the person along the contact area of the foot at the ground, wherein the measurement takes place by means of a pressure sensor plate.

10. The method of claim 7, characterized in that the measuring according to step a1) takes place by determination of the running characteristics of the person, wherein the measuring takes place by means of a camera and a treadmill.

11. The method of claim 7, characterized in that the determination according to step a2) takes place by determining the distribution of the material property and/or mechanical property along the longitudinal axis of the shoe sole.

12. The method of claim 1, characterized in that at least one of the used plastic materials consists of polyurethane, wherein the material is foamed.

13. The method of claim 1, characterized in that the different plastic materials differ in their hardness in the solidified state, in their Shore hardness.

14. The method of claim 1, characterized in that the different plastic materials differ in their colour.

15. The method of claim 1, characterized in that the different plastic materials differ in the fact that at least one additive is added to a base material in different quantity.

16. The method of claim 1, characterized in that all production steps of the shoe sole take place in physical proximity.

17. A method for producing a shoe, comprising a shoe sole and an upper, wherein the production of the shoe sole comprises the steps:
- a) Providing a casting mould for forming at least a part of the shoe sole, wherein the casting mould includes a bottom region vertically at a bottom of the casting mould and a side region forming a side wall of the casting mould cavity, and wherein the casting mould is initially open in an end region lying vertically at a top of the casting mould;
- b) Injecting a first liquid plastic material into a first surface section of the bottom region of the casting mould in a free jet and from at least one nozzle at a location of the side region;
- c) Closing the casting mould by means of a cover region lying vertically at the top of the casting mould and allowing the plastic materials to solidify; and
- d) Opening the casting mould and removing the produced moulded part.

18. The method of claim 17, wherein all plastic materials are injected from the at least one nozzle arranged at a location of the side region.

19. The method of claim 18, wherein the method further comprises a step of injecting a second liquid plastic material into a second surface section of the bottom region.

20. The method of claim 19, wherein the first liquid plastic material and the second liquid plastic material are different.

* * * * *